US012523256B2

(12) United States Patent
Csizmadia et al.

(10) Patent No.: US 12,523,256 B2
(45) Date of Patent: Jan. 13, 2026

(54) ROTATING BICYCLE JOINT ASSEMBLY AND A METHOD FOR PREVENTING INGRESS OF DIRT IN A BEARING

(71) Applicant: CeramicSpeed Sport A/S, Holstebro (DK)

(72) Inventors: Jacob Csizmadia, Holstebro (DK); Anders Pedersen, Herning (DK)

(73) Assignee: CeramicSpeed Sport A/S, Holstebro (DK)

( * ) Notice: Subject to any disclaimer, the term of this patent is extended or adjusted under 35 U.S.C. 154(b) by 70 days.

(21) Appl. No.: 18/437,933

(22) Filed: Feb. 9, 2024

(65) Prior Publication Data
US 2024/0271663 A1    Aug. 15, 2024

(30) Foreign Application Priority Data
Feb. 10, 2023    (DK) .......................... PA 2023 00122

(51) Int. Cl.
*F16C 33/76*    (2006.01)
*F16H 55/36*    (2006.01)
(Continued)

(52) U.S. Cl.
CPC ............. *F16C 33/76* (2013.01); *F16H 55/36* (2013.01); *B60B 27/023* (2013.01);
(Continued)

(58) Field of Classification Search
CPC .. F16C 33/76; F16C 2326/28; F16C 2326/02; F16C 33/762; F16C 13/006; F16C 33/78;
(Continued)

(56) References Cited

U.S. PATENT DOCUMENTS

| 985,711 A | 2/1911 | Sparks |
| 1,385,396 A | 7/1921 | Rayburn |

(Continued)

FOREIGN PATENT DOCUMENTS

| CN | 201305106 | 9/2009 |
| CN | 204140822 U | 2/2015 |

(Continued)

OTHER PUBLICATIONS

Danish Search Report for corresponding Danish Patent Application No. PA 2023 00122 dated Jul. 20, 2023, 4 pages.

(Continued)

*Primary Examiner* — Thomas C Diaz
(74) *Attorney, Agent, or Firm* — Lee & Hayes, P.C.

(57) ABSTRACT

A rotating bicycle joint assembly includes a rotating joint part, a fixed joint part, and a bearing located between the rotating joint part and the fixed joint part. An outer part of the bearing is fixed in relation to one of the rotating joint part or the fixed joint part. An inner part of the bearing is fixed in relation to the other of the rotating joint part or the fixed joint part. A dust cover has an outer cover diameter that is bigger than an outer bearing diameter of the bearing, so that an outer periphery of the dust cover extends radially past the outer part. The rotating bicycle joint assembly also includes an impeller arranged at the outer periphery of the dust cover. The impeller is fixed in relation to the rotating joint part. The dust cover is fixed in relation to the inner part of the bearing.

14 Claims, 7 Drawing Sheets

Figure 5:
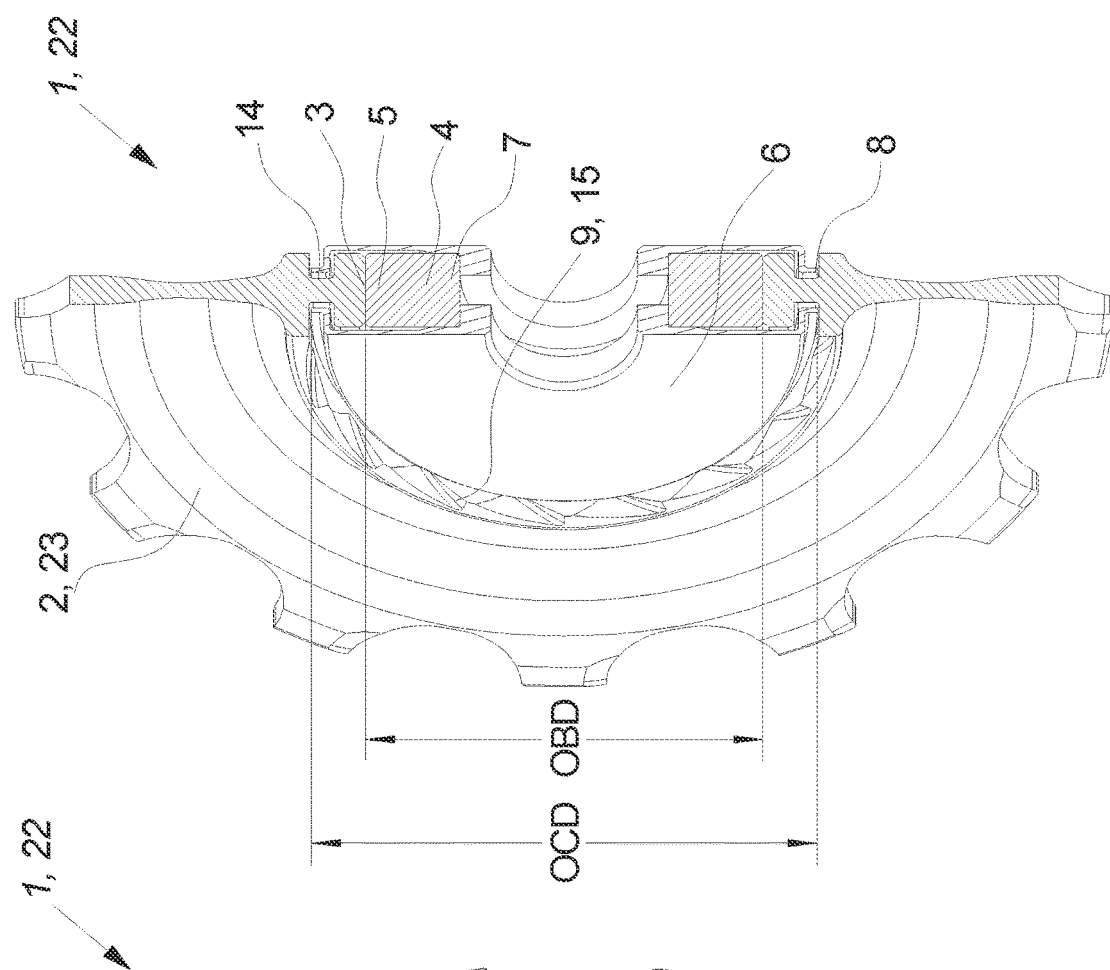

(51) Int. Cl.
   *B60B 27/02*       (2006.01)
   *B62M 3/00*        (2006.01)
   *B62M 9/06*        (2006.01)

(52) U.S. Cl.
   CPC ..... *B60B 2380/90* (2013.01); *B60B 2900/211* (2013.01); *B62M 3/003* (2013.01); *B62M 9/06* (2013.01); *F16C 2326/28* (2013.01)

(58) Field of Classification Search
   CPC ....... F16H 55/36; F16H 55/30; B60B 27/023; B60B 2380/90; B60B 2900/211; B62M 3/003; B62M 9/06; B62M 9/126; B62M 1/00; B62M 9/10; B62M 9/16; F16J 15/164; B65G 39/09
   See application file for complete search history.

(56) References Cited

U.S. PATENT DOCUMENTS

| | | |
|---|---|---|
| 1,400,671 A | 12/1921 | Fischer |
| 2,057,435 A | 10/1936 | Austin |
| 2,163,736 A | 6/1939 | Parker |
| 2,212,774 A | 8/1940 | Guyer |
| 2,513,599 A | 7/1950 | Renshaw |
| 2,827,225 A | 3/1958 | Killian |
| 2,842,974 A | 7/1958 | Willy |
| 2,850,852 A | 9/1958 | Hofberger |
| 2,955,748 A | 10/1960 | Killian |
| 3,119,140 A | 1/1964 | Sallet |
| 3,494,213 A | 2/1970 | Schoenfeld |
| 3,659,471 A | 5/1972 | Marsch |
| 3,788,155 A | 1/1974 | Cigala et al. |
| 3,826,306 A | 7/1974 | Marsh |
| 4,204,720 A * | 5/1980 | Otani ............... F16D 23/14 384/607 |
| 4,629,444 A | 12/1986 | Miranti, Jr. |
| 4,925,367 A | 5/1990 | Paliwoda et al. |
| 5,417,617 A | 5/1995 | Milton |
| 5,947,611 A | 9/1999 | Nagase |
| 7,562,755 B2 | 7/2009 | Spahr |
| 8,061,901 B2 * | 11/2011 | Hosmer ............ F16C 33/805 384/488 |
| 8,398,512 B2 | 3/2013 | Dickinger et al. |
| 8,967,371 B2 | 3/2015 | Dunn |
| 9,410,472 B2 | 8/2016 | Gacka et al. |
| 10,865,882 B2 | 12/2020 | Lutaud et al. |
| 10,907,688 B2 | 2/2021 | Kamiji et al. |
| 11,473,627 B2 * | 10/2022 | Barbera ............ F16J 15/326 |
| 12,188,487 B2 | 1/2025 | Deeg et al. |
| 2003/0144102 A1 | 7/2003 | Lin |
| 2006/0270503 A1 | 11/2006 | Suzuki et al. |
| 2008/0006500 A1 | 1/2008 | Spahr |
| 2008/0167149 A1 | 7/2008 | Beauprez et al. |
| 2009/0298627 A1 | 12/2009 | Johnson et al. |
| 2011/0284346 A1 | 11/2011 | Dunn |
| 2014/0235384 A1 | 8/2014 | Yamaguchi et al. |
| 2015/0345366 A1 | 12/2015 | Gacka et al. |
| 2015/0377341 A1 | 12/2015 | Renner et al. |
| 2016/0006325 A1 | 1/2016 | Grabner et al. |
| 2019/0017602 A1 | 1/2019 | Lutaud et al. |
| 2020/0123901 A1 | 4/2020 | Krivko |
| 2022/0163052 A1 | 5/2022 | Deeg et al. |
| 2022/0324534 A1 * | 10/2022 | Brown ............... B62M 9/1248 |

FOREIGN PATENT DOCUMENTS

| | | | |
|---|---|---|---|
| CN | 204377453 U | 6/2015 | |
| CN | 210461608 U | 5/2020 | |
| DE | 102015214016 | 1/2017 | |
| DE | 102017106196 | 9/2018 | |
| DE | 102019217606 | 5/2020 | |
| DE | 102021210760 | 4/2022 | |
| JP | S4512494 Y1 | 6/1970 | |
| JP | 2020165444 A | 10/2020 | |
| KR | 100822550 B1 * | 4/2008 | ............ B60B 35/16 |
| KR | 100863647 B1 * | 10/2008 | ........... F16C 33/805 |
| WO | WO2010/143694 | 12/2010 | |
| WO | WO2020/110922 | 10/2021 | |

OTHER PUBLICATIONS

Extended European search report for corresponding European patent application No. 24154085.5 dated Jun. 20, 2024, 10 pages.

* cited by examiner

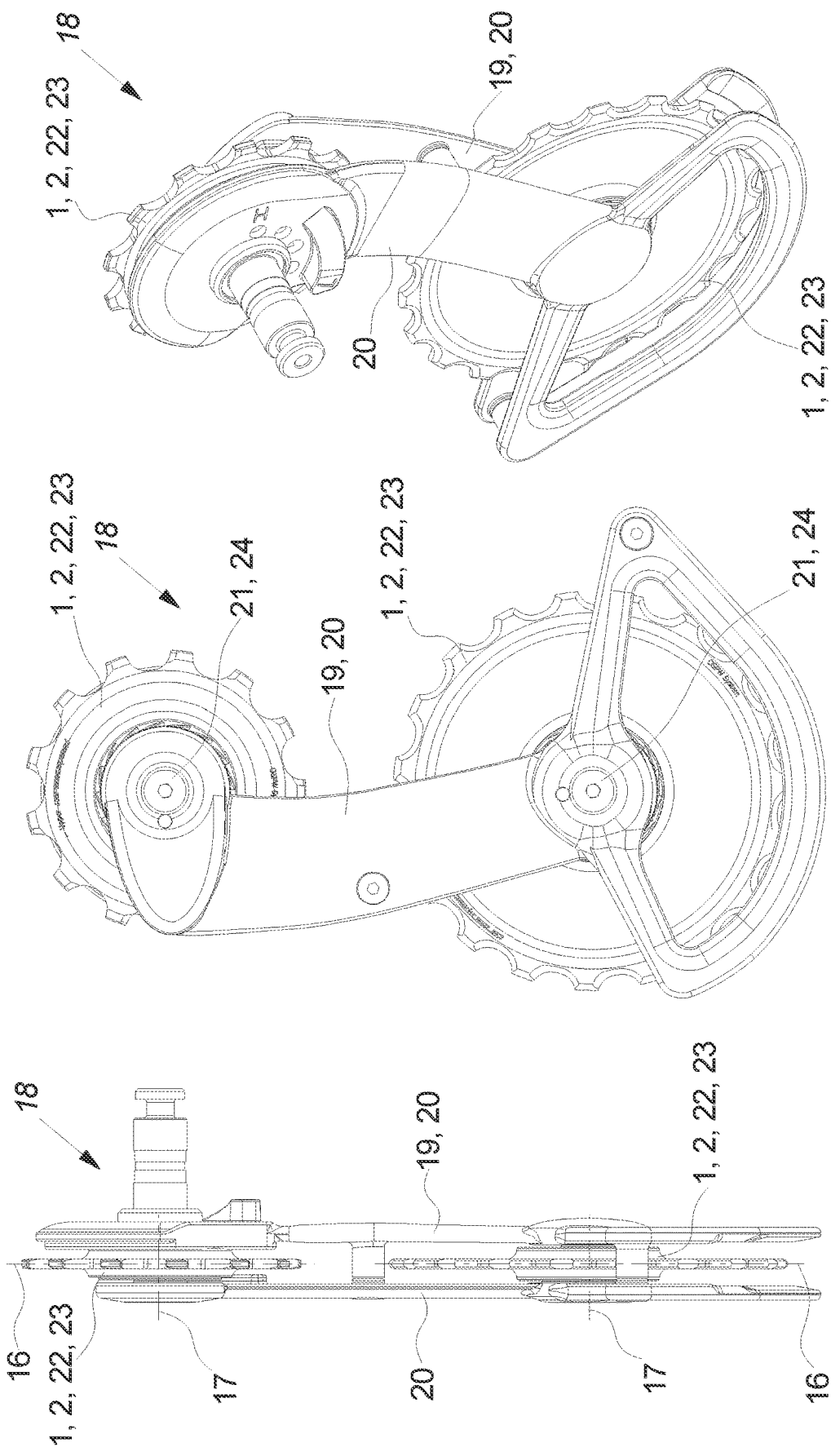

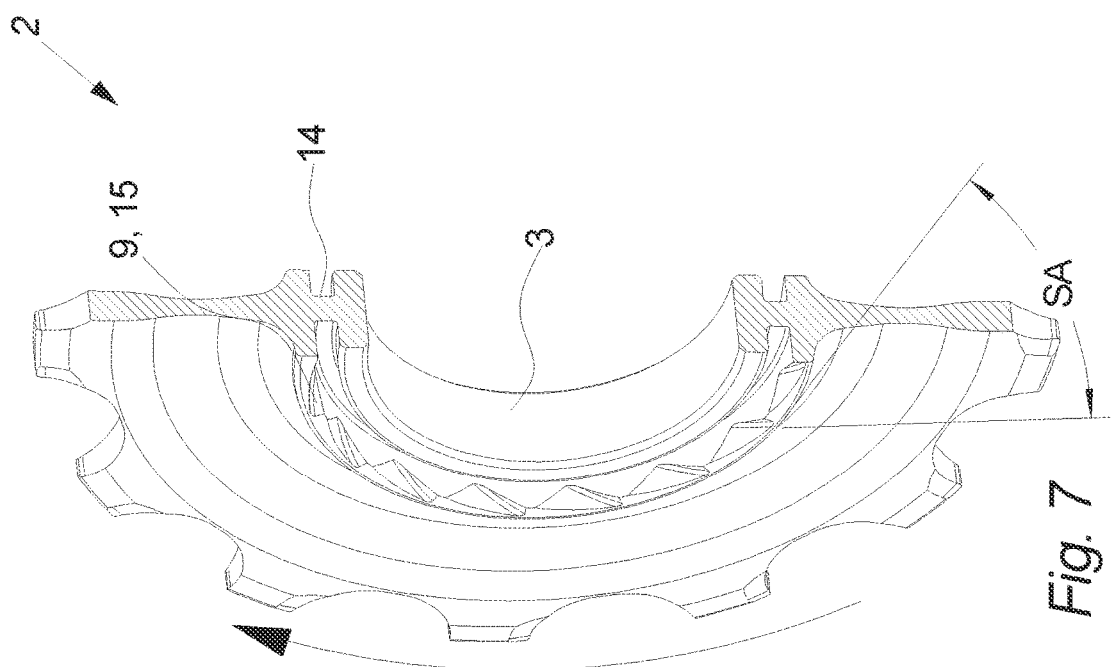
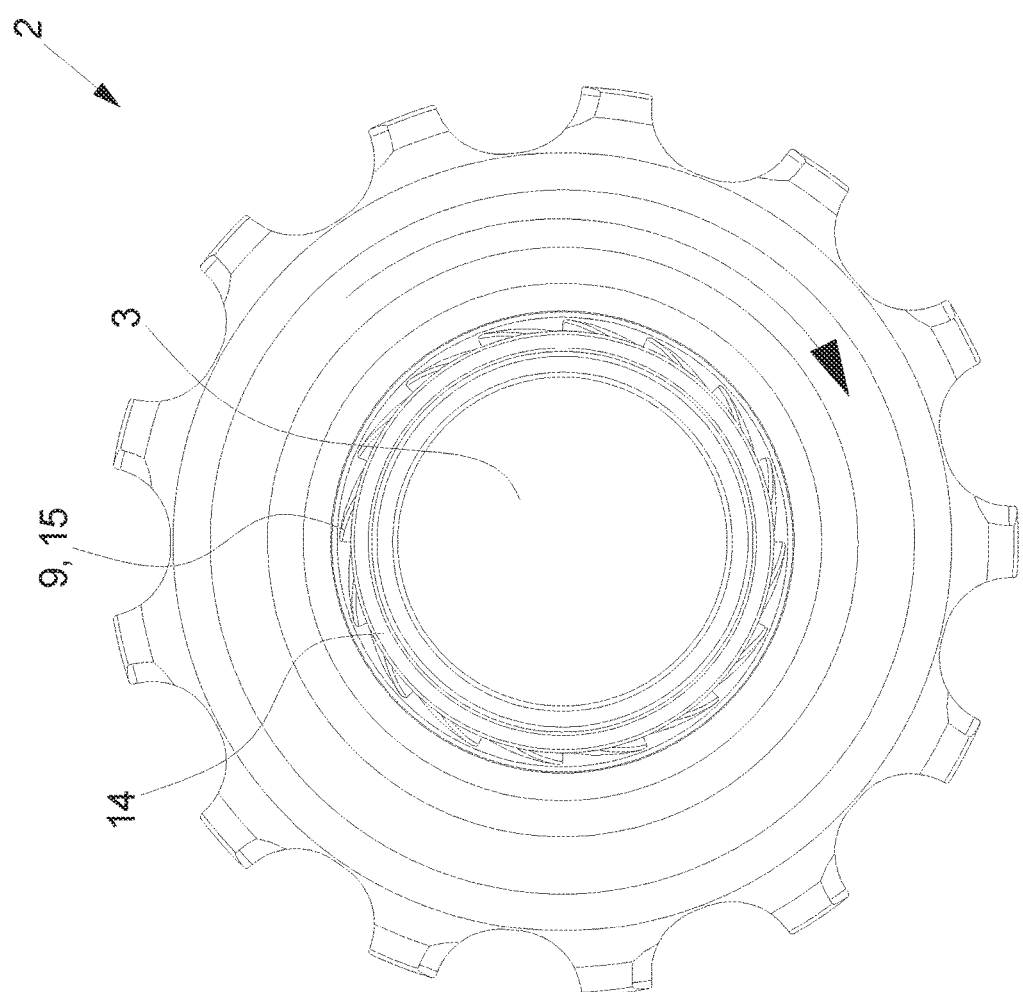

ROTATING BICYCLE JOINT ASSEMBLY AND A METHOD FOR PREVENTING INGRESS OF DIRT IN A BEARING

This Application claims priority to DK Patent Application No. PA 2023 00122, filed Feb. 10, 2023, the contents of which is incorporated herein by reference.

FIELD OF THE INVENTION

The invention relates to rotating bicycle joint assembly comprising a rotating joint part, a fixed joint part and a bearing located between the rotating joint part and the fixed joint part. Furthermore, the invention relates to a method for preventing ingress of dirt in a bearing of a rotating bicycle joint assembly and use of a rotating bicycle joint assembly.

BACKGROUND OF THE INVENTION

In relation to bicycling, and particularly in relation to off-road cycling activities such as cyclo-cross, mountain biking, gravel bicycling and the like, it is known that the bearings in rotating bicycle joint assemblies—such as in a pulley wheel system in an external derailleur system, a crank assembly, a wheel hub assembly or other—are subject to much wear and tear due to ingress of dirt in the bearings. A solution could be to use fully sealed bearings but the friction in these bearings is relatively high which is undesirable in relation to bicycles.

From the Japanese patent application JP 2020-165444 A it is known to provide a pully with a cover connected to the pulley so that a gap is formed between the dust cover and the bearing at the inner diameter of the dust cover. The cover has an axially extending outer ring part provided with dust discharge holes which allows dust to exit the inside to the cover by centrifugal force. However, such dust discharge holes in the cover and the gap between the cover and the bearing also allows easy access of water and dirt to the bearing and is therefore not particularly efficient.

It is therefore an object of the present invention to provide an advantageous rotating bicycle joint assembly and method for preventing ingress of dirt in the bearing of the rotating bicycle joint assembly.

SUMMARY OF THE INVENTION

The invention relates to a rotating bicycle joint assembly comprising a rotating joint part, a fixed joint part and a bearing located between the rotating joint part and the fixed joint part with an outer part of the bearing fixed in relation to one of the rotating joint part and the fixed joint part, and wherein an inner part of the bearing is fixed in relation to the other of the rotating joint part and the fixed joint part. The rotating bicycle joint assembly also comprises a dust cover having an outer cover diameter being bigger than an outer bearing diameter of the bearing, so that an outer periphery of the dust cover is extending radially past the outer part. Furthermore, the rotating bicycle joint assembly comprises an impeller arranged at the outer periphery of the dust cover, wherein the impeller is fixed in relation to the rotating joint part, and wherein the dust cover is fixed in relation to the inner part of the bearing.

Fixating the dust cover in relation to the inner part of the bearing and making it extend radially past the outer part of the bearing is advantageous, in that hereby the entire central and vulnerable part of the bearing is protected by the dust cover and a tight seal is naturally formed between the inner part of the bearing and the dust cover preventing ingress of dirt or other at the inner part of the bearing. And to protect against ingress of mud, dirt and other along the outer periphery of the dust cover it is advantageous to arrange the impeller at the outer periphery of the dust cover—on the dust cover or on a neighbouring part—in that the impeller will deflect any dirt or mud and to at least to some extent generate an air flow away from the outer periphery of the dust cover, thereby protecting the bearing by reducing the risk of ingress of dirt, mud and other along the outer periphery of the dust cover, while at the same time enabling that the rotating bicycle joint assembly can be formed without contact between the outer periphery of the dust cover and the outer part of the bearing or a part in relation to which this outer part is fixed to ensure low internal friction of the sprocket assembly even though the dust cover and the outer part of the bearing will always be rotating in relation to each other during normal use of the bicycle.

The terms "fixed", and "fixating" used throughout this document should be understood as the two parts referred to are fixed or locked against mutual motion. I.e., these terms mean that the two parts are connected by means of connectors such as screws, bolts, rivets, interlocking geometry, adhesive, welding, soldering, shrink fitting or other or by the two parts being formed integrally with each other through casting, moulding, machining, forging or other.

In an aspect of the invention, the bearing is a rolling bearing, wherein the outer part is an outer ring of the rolling bearing, and the inner part is an inner ring of the rolling bearing, and wherein rolling elements are located between the inner ring and the outer ring.

Providing the rotating bicycle joint assembly with a rolling bearing—also called a rolling-element bearing—is advantageous in that hereby the friction is reduced while at the same time increasing life and stability of the bearing.

In this context the term "rolling bearing" refers to any kind of ball bearing, roller bearing, needle bearing or other where rolling elements are located between an inner ring and an outer ring of the bearing.

In an aspect of the invention, the rolling bearing comprises a non-contact seal between the inner ring and the outer ring.

Providing the rolling bearing with a non-contact seal between the inner ring and the outer ring is advantageous in that the seal reduces the risk of ingress of dirt, mud or other into the rolling element part of the bearing while at the same time the non-contact quality ensures low internal friction of bearing.

In an aspect of the invention, the outer periphery of the dust cover is extending radially past the outer part and further axially into an axial groove in the rotating joint part or the fixed joint part, and wherein the impeller is arranged in the axial groove.

Making the outer periphery of the dust cover extend axially into an axial groove in the rotating joint part or the fixed joint part is advantageous in that the risk of ingress of dirt between the dust cover and the respective joint part is hereby reduced. Furthermore, by arranging the impeller in this axial groove, the impeller will not add to the width of the rotating bicycle joint assembly which is advantageous in that if the rotating bicycle joint assembly becomes too wide the joint assembly becomes bulky and un-aerodynamic and particularly in relation to a rotating bicycle joint assembly in the form of a sprocket assembly the risk of a bicycle chain wedging, between the sprocket and the cage in which it is mounted, will increase if the joint assembly becomes too wide.

In an aspect of the invention, the impeller comprises a number of impeller surfaces being inclined in relation to a joint assembly plane being perpendicular in relation to a rotational axis of the rotating joint part.

Making the impeller comprise impeller surfaces arranged in an angle in relation to a joint assembly plane being perpendicular in relation the rotational axis of the rotating joint part is advantageous in that these angled surfaces hereby will deflect any dirt, mud or other axially away from the rotating bicycle joint assembly, if dirt, mud or other hits them when they are rotating during use. And the higher the rotation speed is, the harder the dirt, mud, water and other will be deflected away from the rotating bicycle joint assembly during use. Furthermore, the inclined impeller surfaces will generate an air flow away from the rotating bicycle joint assembly that will reduce the risk of airborne dust, dirt and other finding its way to the inside of the dust cover.

In an aspect of the invention, the impeller surfaces are inclined in a surface angle between 2 and 80 degrees, preferably between 5 and 60 degrees and most preferred between 8 and 45 degrees in relation to the joint assembly plane.

If the impeller surfaces are inclined too much in relation to the joint assembly plane the risk of dirt building up in the impeller is increased and if the impeller surfaces are inclined too little risk of the impeller surfaces not deflecting the dirt increases. Thus, the present surface angle ranges are particularly advantageous in relation to functionality of the impeller.

In an aspect of the invention, the impeller surfaces are also inclined in a radial direction of the rotating joint part so that a radial extent of the impeller surfaces increase outwards.

Also inclining the impeller surfaces in a radial direction of the rotating joint part is advantageous in that the size of the dirt deflecting impeller surfaces hereby decreases the closer the impeller surfaces get to the area where the dust cover and one of the rotating joint part or fixed joint part meets or almost meets at the outer periphery of the dust cover, hereby reducing the risk of the impeller surfaces deflecting dirt into this area. Furthermore, by increasing the radial extent of the impeller surfaces outwards the risk of build-up of dirt in the impeller is reduced.

In an aspect of the invention, a maximum radial extent of the impeller is between 0.5 and 20%, preferably between 1% and 15% and most preferred between 1.5% and 10% of an outer impeller diameter of the impeller.

If the maximum radial extent of the impeller is too big in relation to the outer diameter of the impeller it becomes too difficult to fit the impeller in or on the rotating joint part and the risk of weakening the rotating joint part increases. However, if the maximum radial extent of the impeller is too little the dirt deflecting property of the impeller is reduced so much that the effect of the impeller is negligible. Thus, the present ranges regarding the maximum radial extent of the impeller in relation to the outer impeller diameter of the impeller are advantageous in relation to functionality of the impeller and the rotating joint part.

In an aspect of the invention, the impeller is arranged outside the outer periphery of the dust cover as seen in an axial direction of the rotating joint part.

Locating the impeller axially outside the area where the dust cover meets or almost meets the rotating joint part or fixed joint part is advantageous in that this reduces the risk of the impeller deflecting dirt, mud or other towards this area and any dirt, mud or other will be deflected before it reached the critical area.

In an aspect of the invention, the impeller is formed integrally with the rotating joint part or integrally with the dust cover.

Forming the impeller integrally with the rotating joint part or integrally with the dust cover—e.g., by means of indentations or notches formed in the rotating joint part or the dust cover during moulding or subsequent machining—is advantageous in that this reduced the number of parts in the rotating bicycle joint assembly, which in turn reduces assembly time and cost.

In an aspect of the invention, the impeller is formed as an independent part connected to the rotating joint part or to the dust cover.

Forming the impeller as an independent part which subsequently is connected to the rotating joint part or to the dust cover is advantageous in that the impeller hereby can be given a more complex design, it can be positioned more advantageously in relation to the area where the dust cover and the outer part of the bearing meets or almost meets, and it enables that the impeller can be made in a more suited material.

The invention further relates to a method for preventing ingress of dirt in a bearing of a rotating bicycle joint assembly. The method comprises the steps of:
  placing the bearing between a rotating joint part and a fixed joint part of the rotating bicycle joint assembly,
  fixating an outer part of the bearing in relation one of the rotating joint part and the fixed joint part, and fixating an inner part of the bearing in relation to the other of the rotating joint part and the fixed joint part,
  fixating a dust cover of the rotating bicycle joint assembly in relation to the inner part of the bearing, wherein an outer cover diameter of the dust cover is bigger than an outer cover diameter of the bearing, so that the dust cover is extending radially past the outer part,
  fixating an impeller of the rotating bicycle joint assembly in relation to the rotating joint part at the outer cover diameter of the dust cover, and
  rotating the rotating joint part and the impeller so that the impeller deflects dirt away from the rotating joint part.

During use the rotating joint part rotates and using this rotation to drive the impeller is advantageous in that no further drives for the impeller is needed, and locating the impeller at the outer edge of the dust cover is advantageous in that the impeller hereby will deflect dirt away from the rotating bicycle joint assembly at the area where the dust cover meets or almost meets the rotating joint part or the fixed joint part and thereby reduce the risk of ingress of dirt in the bearing.

In an aspect of the invention, the method comprises the step of fixating the impeller in relation to the rotating joint part by forming the impeller integrally with the rotating joint part or integrally with the dust cover.

Forming the impeller integrally with the rotating joint part or integrally with the dust cover is advantageous in that this reduces material use, it reduces assembly cost, and it simplifies the rotating bicycle joint assembly design.

In an aspect of the invention, the method is performed by means of a rotating bicycle joint assembly according to any of the previously discussed rotating bicycle joint assemblies.

Hereby is achieved an advantageous embodiment of the invention.

The invention also relates to use of a rotating bicycle joint assembly according to any of the previously discussed rotating bicycle joint assemblies in a pulley wheel system, a crank assembly or a wheel hub assembly of a bicycle.

The pulley wheel system of a derailleur system, the crank assembly and the wheel hub assembly of a bicycle are typically arranged in positions where they are particularly exposed to dirt, mud, water and other and it is therefore particularly advantageous to use a rotating bicycle joint assembly according to the present invention in a pulley wheel system of a derailleur system, in a crank assembly or in a wheel hub assembly of a bicycle.

For a more complete understanding of the disclosure, reference is now made to the following brief description of various combinable embodiments of the invention.

FIGURES

Figure 4:
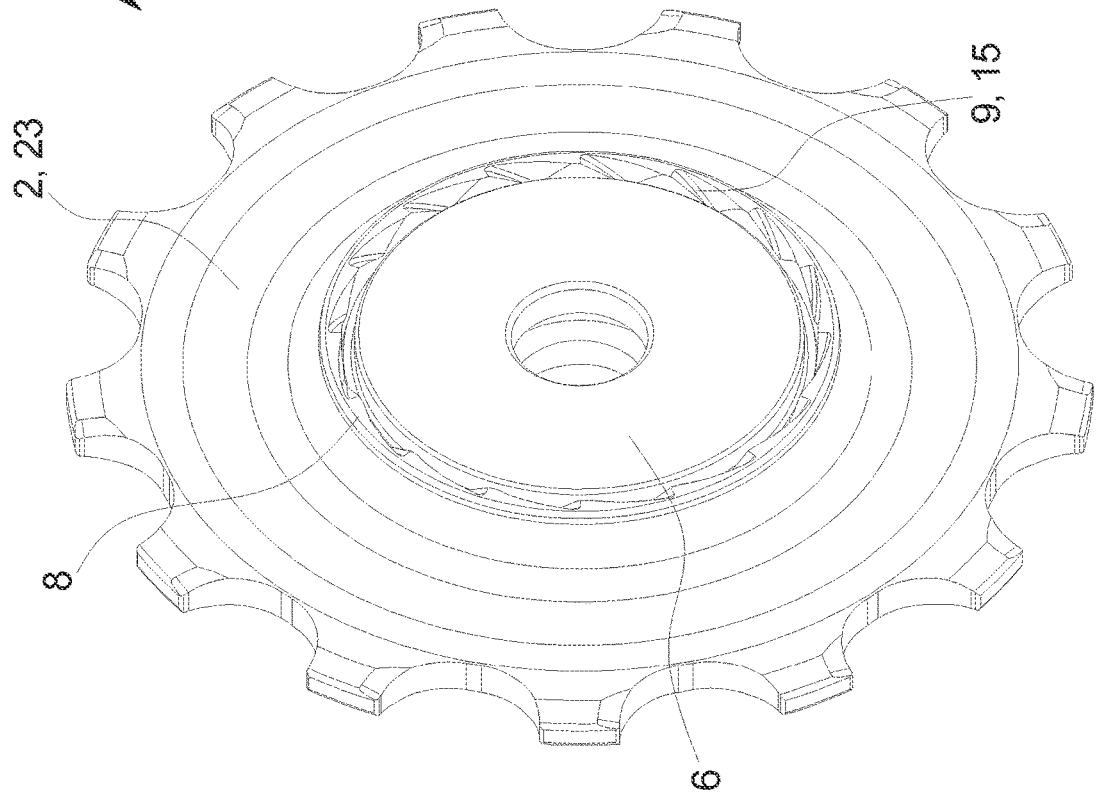
Figure 10:
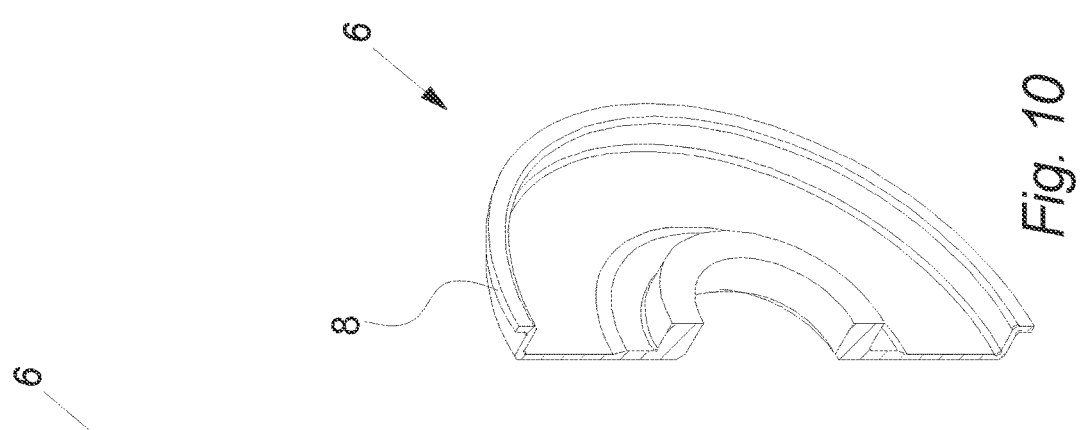
Figure 9:
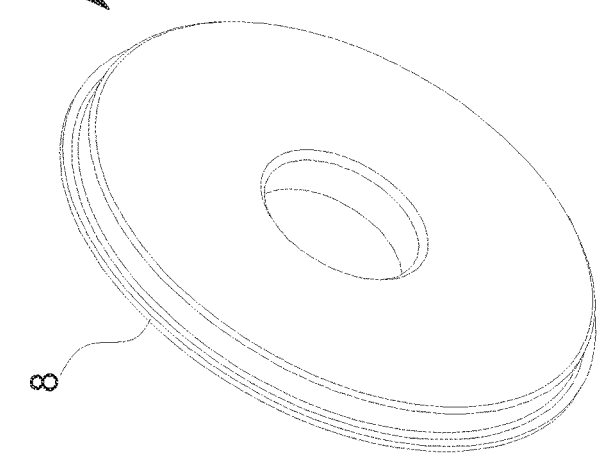
Figure 8:
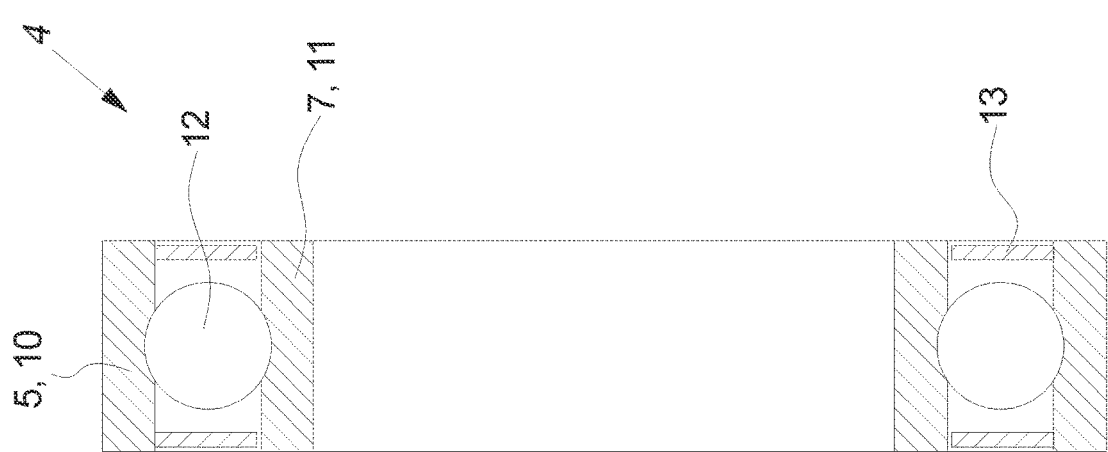
Figure 13:
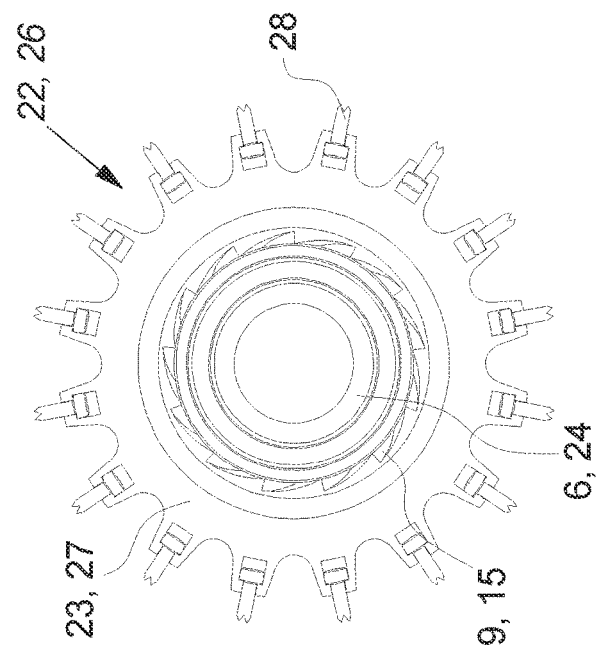
Figure 11:
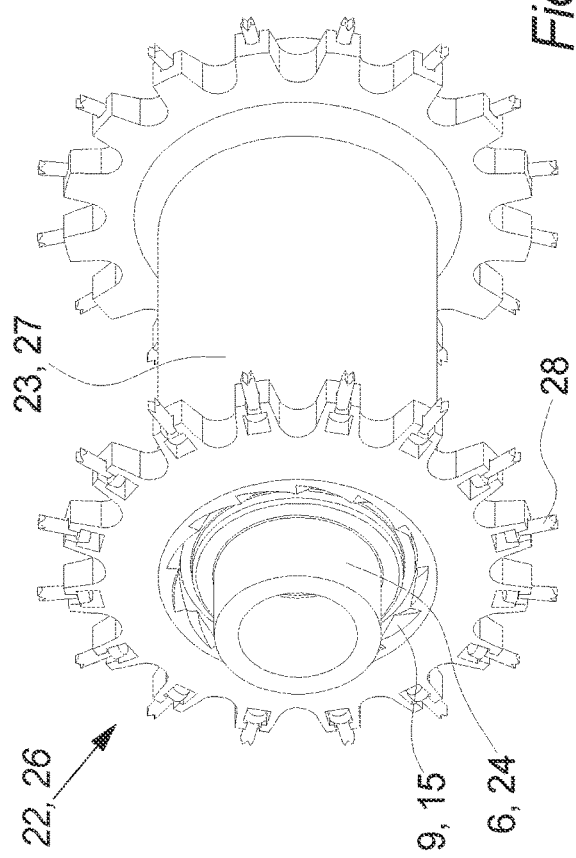
Figure 12:
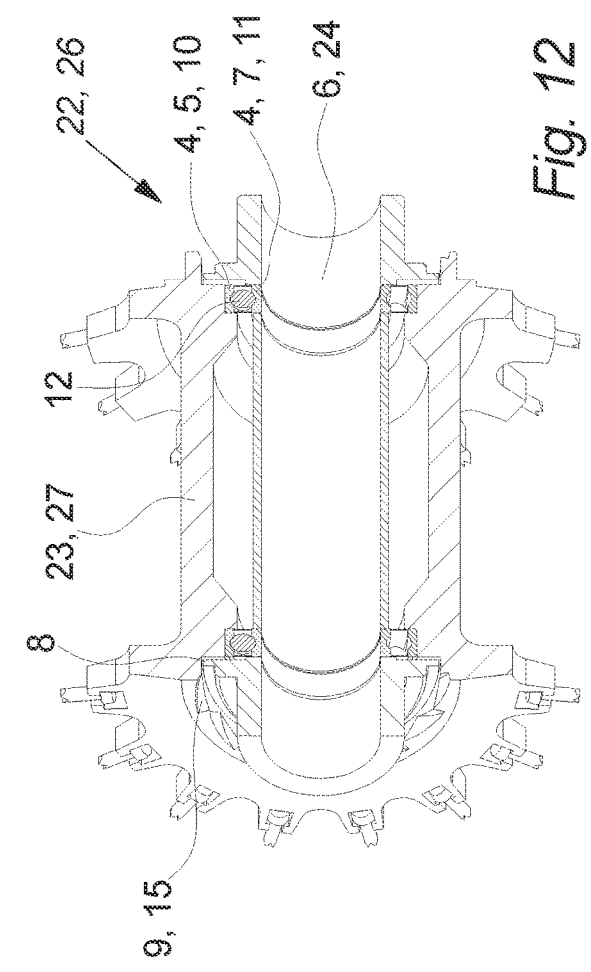
Figure 14:
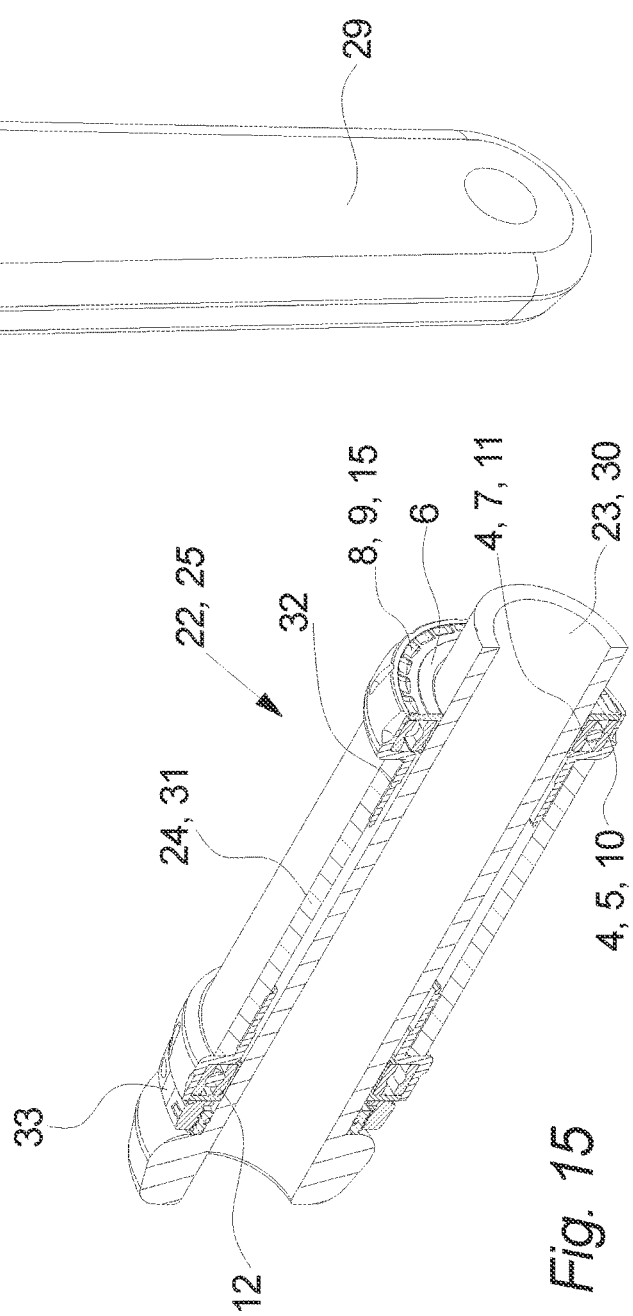
Figure 16:
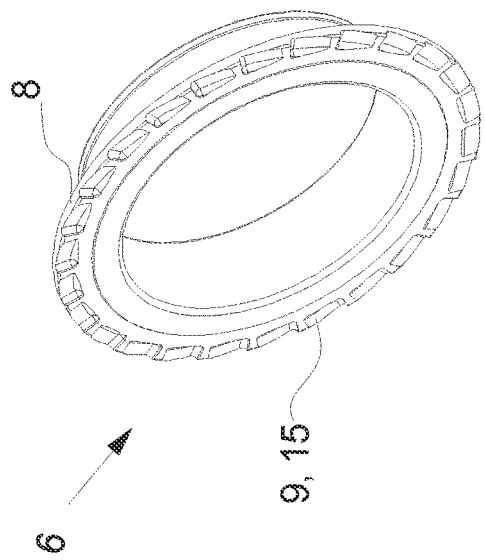
Figure 15:
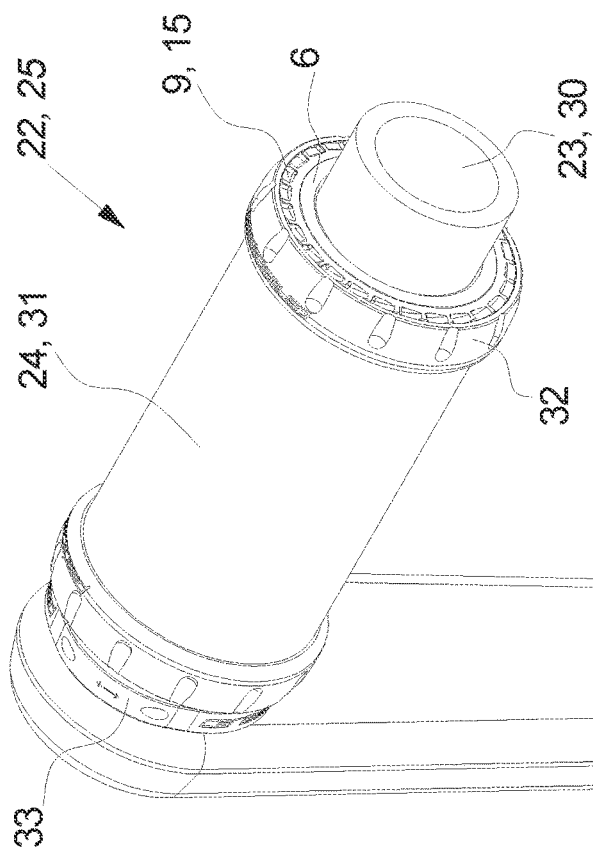
Figure 17:
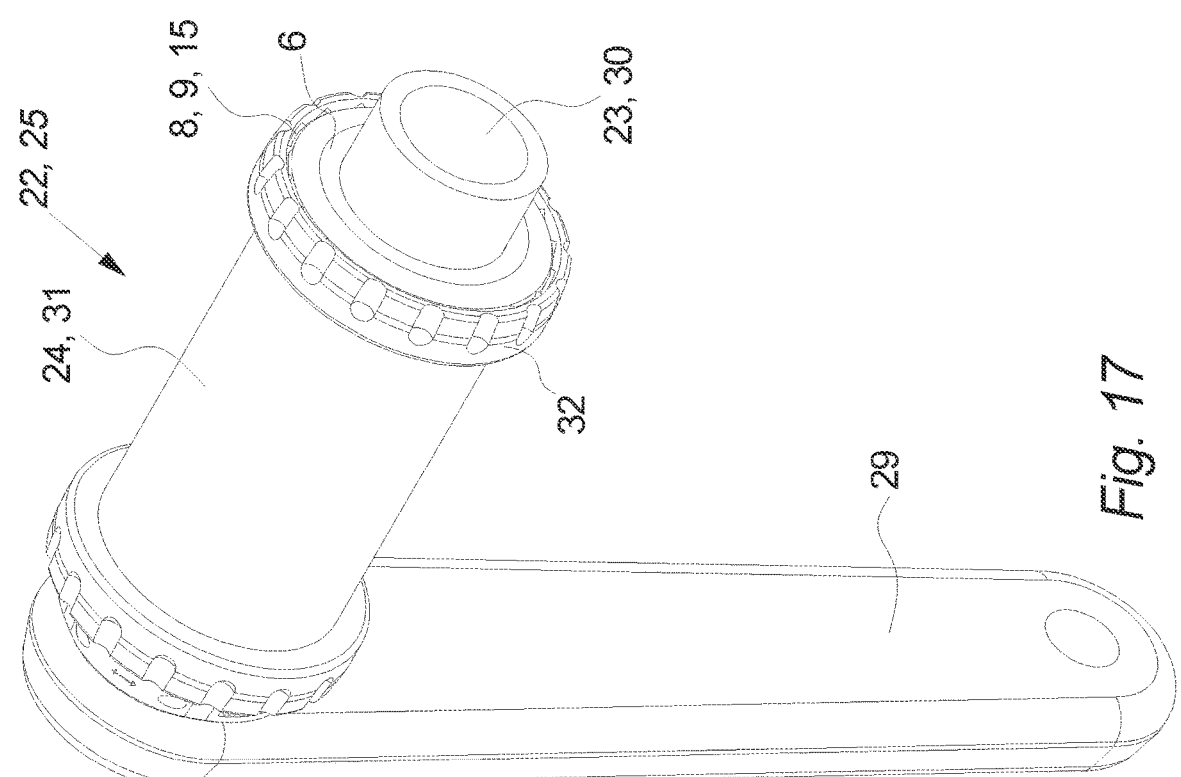
Figure 19:
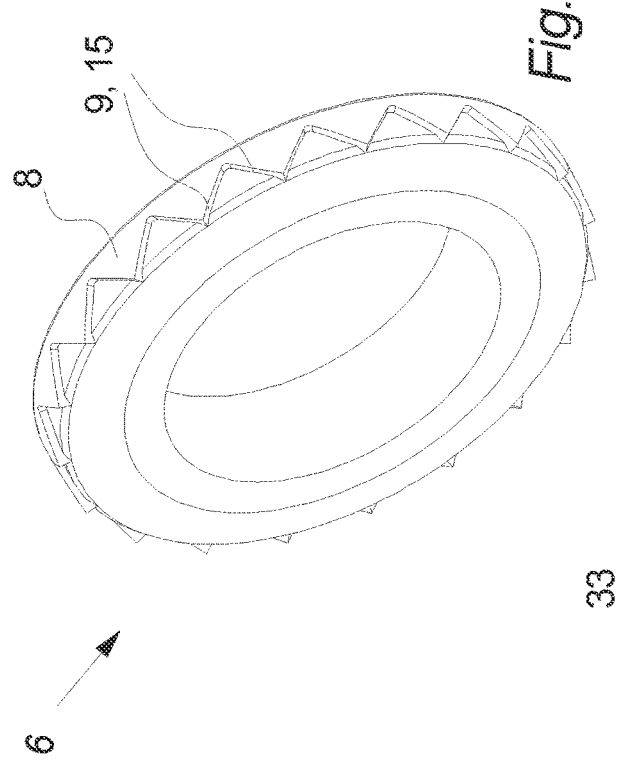
Figure 18:
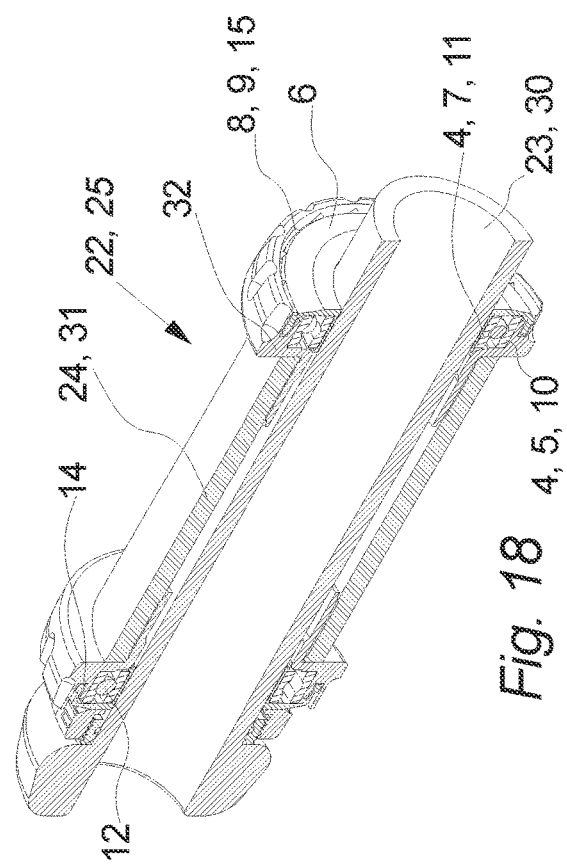

FIG. 1 illustrates a pulley wheel system of a derailleur system, as seen from the front, FIG. 2 illustrates a pulley wheel system of a derailleur system, as seen from the side, FIG. 3 illustrates a pulley wheel system of a derailleur system, as seen in an isometric view, FIG. 4 illustrates a sprocket assembly, as seen in an isometric view, FIG. 5 illustrates a cross section through the middle of a sprocket assembly, as seen in an isometric view, FIG. 6 illustrates a sprocket, as seen from the side, FIG. 7 illustrates a cross section through the middle of a sprocket, as seen in an isometric view, FIG. 8 illustrates a cross section through the middle of a rolling bearing, as seen from the front, FIG. 9 illustrates a dust cover, as seen in an isometric view, FIG. 10 illustrates a cross section through the middle of a dust cover, as seen in an isometric view, FIG. 11 illustrates a wheel hub assembly, as seen in an isometric view, FIG. 12 illustrates a cross section through the middle of a wheel hub assembly, as seen in an isometric view, FIG. 13 illustrates a wheel hub assembly, as seen from the side, FIG. 14 illustrates a first embodiment of a crank assembly, as seen in an isometric view, FIG. 15 illustrates a cross section through the middle of a first embodiment of a crank assembly, as seen in an isometric view, FIG. 16 illustrates a dust cover for the first embodiment of a crank assembly, as seen in an isometric view, FIG. 17 illustrates a second embodiment of a crank assembly, as seen in an isometric view, FIG. 18 illustrates a cross section through the middle of a second embodiment of a crank assembly, as seen in an isometric view, and FIG. 19 illustrates a dust cover for the second embodiment of a crank assembly, as seen in an isometric view.

DETAILED DESCRIPTION

FIG. 1 illustrates a pulley wheel system 18 of a derailleur system for a bicycle, as seen from the front, FIG. 2 illustrates a pulley wheel system 18 of a derailleur system, as seen from the side, and FIG. 3 illustrates a pulley wheel system 18 of a derailleur system, as seen in an isometric view. FIGS. 1, 2, and 3 all illustrates an example of a rotating bicycle joint assembly 22 in the form of a pulley wheel system 18 in the derailleur system for a bicycle.

A derailleur system is a variable-ratio bicycle gearing system consisting of a chain (not shown), multiple sprockets (not shown) of different sizes fixed in relation to the back wheel (not shown) of the bicycle (not shown), and a mechanism (not shown) to move the chain from one sprocket to another. A modern rear derailleur system typically consists of a moveable chain-guide that is operated remotely by the rider through a lever and a cable. When a rider operates the lever while pedaling, the change in cable tension moves the chain-guide from side to side, "derailing" the chain onto different sprockets. Or the derailleur system could comprise an electrical system comprising a motor operated chain-guide and switch arrangement e.g., communicating wirelessly.

The rear derailleur serves double duty: moving the chain between rear wheel sprockets and taking up chain slack caused by moving to a smaller sprocket at the rear or a smaller chainring by a front derailleur. In order to accomplish this second task, it is positioned in the path of the bottom, slack portion of chain. Although variations exist, most rear derailleur systems have several components in common. They have a pulley wheel system 18 as disclosed in FIGS. 1-3 comprising a cage 19 that holds two sprocket assemblies 1 that guide the chain in an S-shaped pattern. The sprocket assemblies 1 used in the pulley wheel system 18 are also known as the jockey pulley or guide pulley (top) and the tension pulley (bottom). The cage 19 rotates in its plane and is spring-loaded to take up chain slack. The cage 19 is positioned under the desired back wheel sprocket by an arm (not shown) that can swing back and forth under the sprockets. The arm is usually implemented with a parallelogram mechanism to keep the cage 19 properly aligned with the chain as it swings back and forth. The other end of the arm mounts to a pivot point attached to the bicycle frame. The arm pivots about this point to maintain the cage at a nearly constant distance from the different sized rear wheel sprockets.

In this embodiment the cage 19 comprises two side arms 20 connecting the two sprocket shafts 21 on which the sprocket assemblies 1 are mounted to rotate freely. The distance between the side arms 20 corresponds with the width of the chain (not shown) so that the chain cannot break off in the cage and e.g., wedge between the sprocket assemblies 1 and the side arms 20—i.e., typically the distance between the side arms 20 is slightly bigger than the width of the chain. For this reason and others—such as weight, cost, and air resistance—the width of the sprocket assembly 1 is typically also limited to correspond to the width of the chain.

FIG. 4 illustrates an example of a rotating bicycle joint assembly 22 in the form of a sprocket assembly 1, as seen in an isometric view and FIG. 5 illustrates a cross section through the middle of the sprocket assembly 1, as seen in an isometric view.

In this embodiment the sprocket assembly 1 comprises a sprocket 2 having a centre orifice 3 in which a bearing 4 is located with an outer part 5 of the bearing 4 fixed in relation to a rotating joint part 23 of the rotating bicycle joint assembly 22—i.e. in this embodiment the outer part 5 of the bearing 4 fixed in relation to the sprocket 2. In this embodiment bearing 4 is a rolling bearing 4 in the form of a ball bearing but in another embodiment the bearing 4 could be another type of rolling bearing 4—such as a roller bearing, a needle bearing or other—or the bearing 4 would be a plain bearing, a journal bearing or other. In this embodiment the outer part 5 of the bearing 4 is fixed in relation to the rotating joint part 23 through a press fit but in another embodiment the fixation could also or instead be made by through adhesive, shrink fitting, interlocking geometry, screws or other or any combination thereof.

In this embodiment a dust cover 6 is provided on both sides of the bearing 4 to reduce the risk of dust, dirt, mud or other reaching the bearing 4 and potentially causing malfunction of the bearing 4. However, in another embodiment only one side of the bearing 4 would be provided with a dust cover 6 e.g., if the functionality of the dust cover was included in other neighbouring parts on the other side of the bearing 4. In this embodiment the dust covers 6 are fixed in relation to a fixed joint part 24 of the rotating bicycle joint assembly 22 which in this case is an inner part 7 of the bearing 4, in that the dust covers 6 are arranged to press in the inner part 7 of the bearing 4 when the sprocket assembly 1 is mounted on a sprocket shaft (not shown) and e.g., a nut is tightened against one of the dust covers 6. However, in another embodiment the dust covers 6 could also or instead be fixed in relation to the inner part 7 of the bearing 4 by dedicated holes in the dust covers by means of which screws, bolts or other could force the dust covers 6 against each other and thereby clamp the inner part 7 of the bearing 4, the dust covers 6 could also or instead be connected directly to the inner part 7 of the bearing 4 by means of screws, bolts, rivets, adhesive or other and/or the dust covers 6, the dust cover 6 could be fixed in relation to the sprocket shaft (not shown), which in this case is also a fixed joint part 24 of the rotating bicycle joint assembly 22 or the dust cover 6 could be fixed in relation to the inner part 7 of the bearing 4 in numerous other ways.

In this embodiment the outer cover diameter OCD of the dust cover 6 is around 23 mm and the outer bearing diameter OBD of the bearing 4 is around 16 mm so that the outer periphery 8 of the dust cover 6 is extending radially past the outer part 5 of the bearing 4. However, sprocket assemblies 1 can be made in a multitude of varieties depending on the specific use, the specific design and other and in another embodiment outer cover diameter OCD could be bigger—such as 28 mm, 34 mm, 40 mm or even bigger—or it could be smaller—such as 21 mm, 17 mm, 14 mm or even smaller. And likewise, in another embodiment outer bearing diameter OBD could be bigger—such as 20 mm, 25 mm, 30 mm or even bigger—or it could be smaller—such as 14 mm, 12 mm, 10 mm or even smaller—as long at the diameter OCD of the dust cover 6 is bigger than the diameter OBD of the bearing 4 so that the outer periphery 8 of the dust cover 6 is extending radially past the outer part 5 of the bearing 4.

In this embodiment the outer periphery 8 of the dust cover 6 is extending radially past the outer part 5 of the bearing 4 and further axially into an axial groove 14 in the sprocket 2, so that the "free" end of the dust cover 6 is tucked away inside the axial groove 14 in the sprocket 2 to reduce the risk of dirt, mud and other finding its way to the bearing 4 through a potential small gap between the outer periphery 8 of the dust cover 6 and the sprocket 2. However, in another embodiment the outer periphery 8 of the dust cover 6 could be arranged just inside an annular protrusion on the sprocket 2, along a flat surface on the sprocket 2 or at another location.

In this embodiment the sprocket assembly 1 is further provided with an impeller 9 arranged at the outer periphery 8 of the dust cover 6 and fixed in relation to the rotating joint part 23—i.e., in this case the sprocket 2. In this embodiment the impeller 9 is machined into the sprocket 1 so that the impeller 9 is formed integrally with the sprocket 2. However, in another embodiment the impeller 9 could be an independent part which was connected to the rotating joint part 23 by means of connectors—such as screws, bolt, rivets, adhesive, shrink fitting, welding or other.

In this embodiment the impeller 9 is arranged in the axial groove 14 but in another embodiment the impeller 9 could be placed on an outside surface of the rotating joint part 23, on a protrusion of the rotating joint part 23 or elsewhere on the rotating joint part 23 as long as the impeller 9 is arranged at the outer periphery 8 of the dust cover 6.

In this embodiment all of the impeller 9 is arranged axially outside the outer periphery 8 of the dust cover 6 to deflect dirt, dust and other before or after it reaches the outer periphery 8 of the dust cover 6. However, in another embodiment at least some of the impeller 9 could axially overlap the outer periphery 8 of the dust cover 6 or the impeller 9 could be placed axially inside the outer periphery 8 of the dust cover 6.

In this embodiment the rotating bicycle joint assembly 22 is used for preventing ingress of dirt in the bearing 4 by means of the following method. First the bearing 4 is placed between the rotating joint part 23—in this case the sprocket 2—and the fixed joint part 24—in this case the sprocket shaft (not shown)—in this case in the centre orifice 3 of the sprocket 2 and the outer part 5 of the bearing 4 is fixed in relation to the sprocket 2 and the inner part 7 of the bearing 4 is fixed in relation to the sprocket shaft (not shown) by means of one or more of the previously discussed methods for fixating these parts in relation to each other. A dust cover 6 is then fixed coaxially in relation to the inner part 7 of the bearing 4 so that the dust cover 6 is extending radially past the outer part 5 of the bearing 4—because the diameter OCD of the dust cover 6 is bigger than the diameter OBD of the bearing 4. An impeller 9 is fixated in relation to the sprocket 2 at the outer cover diameter OCD of the dust cover 6 and during normal use the sprocket 2 and the impeller 9 is rotated so that the impeller 9 deflects dirt, mud, dust, water and other away from the sprocket 2 and thereby away from the gap between the outer periphery 8 of the dust cover 6 and the sprocket 2. However, it should be noted that several of these method steps can be performed in a different order or simultaneously. E.g., if the impeller 9 is formed integrally with the sprocket 2—as shown in the figures—the impeller 9 would obviously be formed in the rotating joint part 23—during casting or/or subsequent machining—before the bearing 4 is fixed to the sprocket 2 and before the dust cover(s) 6 is mounted.

The impellers 9 efficiency regarding deflection of dirt, mud and other during use is at least to some degree dependent on the rotational direction of the sprocket assembly and in another embodiment the method comprises the step of orientation the impeller 9 to correspond to the intended rotational direction of the sprocket 2 and/or rotate the sprocket 2 and the impeller 9 so that the impeller surfaces 15 of the impeller 9 are angled so that the distance from the impeller surfaces 15 to a joint assembly plane 16 (see FIG. 1) being perpendicular in relation to a rotational axis 17 (see FIG. 1) of the rotating joint part 23—in this case the sprocket 2—decreases in the rotational direction of the sprocket 2 so that the impeller 9 better deflects dirt, mud, dust, water and other away from the sprocket 2.

FIG. 6 illustrates a sprocket 2, as seen from the side, and FIG. 7 illustrates a cross section through the middle of a sprocket 2, as seen in an isometric view.

In this embodiment the impeller 9 comprises sixteen impeller surfaces 15 evenly distributed over 360 degrees. However, in another embodiment the impeller 9 could comprise more impeller surfaces 15—such as 20, 30, 40 or even more—or the impeller 9 could comprise less impeller surfaces 15—such as 13, 10, 8 or even less—e.g., depending on the specific use of the sprocket assembly 1, the specific design of the sprocket assembly 1, the size of the sprocket assembly 1 or other.

In this embodiment the impeller surfaces 15 are inclined in relation to the joint assembly plane 16 (see FIG. 1) so that the impeller surfaces 15 deflect dirt, mud, dust, water and other away from the sprocket 2 when the impeller 9 is rotated and in this embodiment the impeller surfaces 15 are inclined in a surface angle SA of around 30 degrees in relation to the joint assembly plane 16. However, in another embodiment the surface angle SA of the impeller surfaces 15 could be bigger—such as 35 degrees, 42 degrees, 48 degrees or even bigger—or the surface angle SA of the impeller surfaces 15 could be smaller—such as 27 degrees, 24 degrees, 16 degrees or even smaller—e.g., dependent on the specific use of the sprocket assembly 1, the specific design of the sprocket assembly 1, the size of the sprocket assembly 1 or other.

When the impeller 9 is used in a sprocket assembly 1 in a rotating bicycle joint assembly 22 in the form of a pulley wheel system 18 of a derailleur system for a bicycle, the impeller 9 will always (or almost always) rotate in one direction in that one cannot reverse a bicycle with this gear type. Therefore, the impeller 9 in this embodiment only comprises impeller surfaces 15 inclined in a direction corresponding to the intended rotational direction of the sprocket 2—as indicated by the arrows on FIGS. 6 and 7. However, in another embodiment the impeller 9 could comprise impeller surfaces 15 that were inclined in both rotational directions to be able to deflect dirt, mud and other no matter the rotational direction and or the sprocket assembly 1 could comprise more than one impeller 9 having opposite or different inclination directions and/or angles.

In this embodiment the impeller surfaces 15 are also inclined in a radial direction of the sprocket 2 so that a radial extent of the impeller surfaces 15 increase outwards but in another embodiment the radial extent of the impeller surfaces 15 could be constant, it could vary throughout the radial extent or the radial extent of the impeller surfaces 15 could even decrease outwards—e.g., dependent on the specific use of the rotating bicycle joint assembly 22, the specific design of the rotating bicycle joint assembly 22, the specific location and/or nature of the impeller 9 or other.

In this embodiment the maximum radial extent of the impeller 9 is around 1 mm and the outer impeller diameter of the impeller 9 is around 26 mm. Thus, in this embodiment the maximum radial extent of the impeller 9 is around 4% of the outer impeller diameter of the impeller 9. However, in another embodiment the maximum radial extent of the impeller 9 could be bigger—such as 7%, 12%, 17% or even more of the outer impeller diameter of the impeller 9—or the maximum radial extent of the impeller 9 could be smaller—such as 3%, 2.5%, 1.8% or even less of the outer impeller diameter of the impeller 9—e.g., dependent on the specific use of the rotating bicycle joint assembly 22, the specific design of the rotating bicycle joint assembly 22, the specific location and/or nature of the impeller 9 or other.

FIG. 8 illustrates a cross section through the middle of a rolling bearing 4, as seen from the front.

In the embodiments disclosed in FIGS. 1-5, 11-15, and 17-18 the bearing 4 in the rotating bicycle joint assembly 22 is a rolling bearing 4 in the form of a ball bearing comprising an outer part 5 in the form of an outer ring 10 and an inner part 7 in the form of an inner ring 11, wherein rolling elements 12 in the form of balls are located to rotate between the inner ring 11 and the outer ring 10. In this embodiment the rolling bearing 4 further comprises a non-contact seal 13 arranged between the inner ring 11 and the outer ring 10 to aid in reducing the risk of dirt and other reaching the rolling elements inside the bearing 4. In this embodiment the non-contact seal 13 is fixed in relation to the outer ring 10 and a small gap is formed between the seal 13 and the inner ring 11 to ensure that the seal 4 does not increase friction in the bearing 4. However, in another embodiment the bearing 4 could comprise another type of seal—such as a light contact seal having a reduced friction in relation to fully sealed bearings.

FIG. 9 illustrates a dust cover 6, as seen in an isometric view, and FIG. 10 illustrates a cross section through the middle of a dust cover 6, as seen in an isometric view.

In this embodiment the dust cover 6 is formed as a disc arranged to be clamped around the bearing 4 during mounting of the rotating bicycle joint assembly 22 but as previously discussed in another embodiment the dust cover 6 could further comprise connectors for being fixed to the bearing 4.

FIG. 11 illustrates a wheel hub assembly 26, as seen in an isometric view, FIG. 12 illustrates a cross section through the middle of a wheel hub assembly 26, as seen in an isometric view, and FIG. 13 illustrates a wheel hub assembly 26, as seen from the side.

In this embodiment the rotating bicycle joint assembly 22 is in the form of a wheel hub assembly 26 enabling that a wheel of a bicycle may rotate on a wheel shaft (not shown). In this embodiment the wheel hub assembly 26 comprises a rotating joint part 23 in the form of a hub housing 27 to which the spokes 28 of the wheel is connected. In this embodiment the hub housing 27 is connected to the outer part 5 of the bearing 4 and the inner part 7 of the bearing 4 is connected to a fixed joint part 24 which in this case is the wheel shaft (not shown). Dust covers 6 are located on both sides so that when a nut, a clamping mechanism or other on the wheel shaft is tightened, the dust covers 6 are pushed against each other so that they are pressing against the inner parts 7 of the bearings 4 and so that the dust covers, the inner parts 7 of the bearings 4 and the fixed joint part 24 (i.e., the wheel shaft (not shown)) are fixed together so that neither can be displaced or rotated in relation to the other fixed parts.

In this embodiment the dust covers 6 are not rotating so in this embodiment the impeller 9 is arranged on the rotating joint part 23—i.e. the hub housing 27—in a similar fashion as the impeller 9 disclosed in FIGS. 1-7 is arranged on the sprocket 2. However, in another embodiment the wheel hub assembly 26 could be designed differently with fewer or more parts but in relation to a wheel hub assembly 26, the impeller 9 will always be fixed in relation to a part of the wheel hub assembly 26 that will be rotating around the wheel shaft during normal use of the bicycle.

FIG. 14 illustrates a first embodiment of a crank assembly 25, as seen in an isometric view, FIG. 15 illustrates a cross section through the middle of a first embodiment of a crank assembly 25, as seen in an isometric view, and FIG. 16 illustrates a dust cover 6 for the first embodiment of a crank assembly 25, as seen in an isometric view.

In this embodiment the rotating bicycle joint assembly 22 is in the form of a crank assembly 25 enabling that the pedals (not shown) of a bicycle may be rotated to rotate a chain drive connected to a wheel of the bicycle to propel the bicycle during normal use of the bicycle. In this embodiment pedal arms 29 (only one of two is shown in FIG. 14) are connected to either ends of a rotating joint part 23 in the form of a crank shaft 30 to rotate the crank shaft 30 during normal use of the bicycle. In this embodiment the crank shaft 30 is extending through a fixed joint part 24 which in this case is the crank housing 31 which is typically rigidly connected to the rest of the bicycle frame. In this embodiment the fixed joint part 24 (i.e., in this case the crank housing 31) is connected to the outer part 5 of the bearing 4 through an intermediate part 32 and the inner part 7 of the bearing 4 is connected to the rotating joint part 24 (i.e., in this case the crank shaft 30). Dust covers 6—as illustrated in FIG. 16—are also fixed in relation to the inner part 7 of the bearings 4 by means of pressing mechanisms 33, in this case located at both ends of the crank housing 31 (only one of these pressing mechanisms 33 is shown in FIGS. 14 and 15), arranged to press against the dust covers 6 and in turn against the inner part 7 of the bearings 4 to lock the dust covers 6 and the inner part 7 of the bearings 4 to the crank shaft 30, so that these parts are rotating with the crank shaft 30. I.e., in this embodiment the dust covers 6 are rotating during normal use of the bicycle so in this embodiment the impeller 9 is arranged at the outer periphery 8 of the dust covers 6 by being formed integrally with the outer periphery 8 of the dust covers 6 to prevent dirt and other from entering the small gab between the rotating dust covers 6 and the stationary outer part 5 of the bearings 4. However, in another embodiment the crank assembly 25 could be designed differently with fewer or more parts but in relation to a crank assembly 25, the impeller 9 will always be fixed in relation to a part of the crank assembly 25 that will be rotating in relation to the stationary crank housing 31 during normal use of the bicycle.

FIG. 17 illustrates a second embodiment of a crank assembly 25, as seen in an isometric view, FIG. 18 illustrates a cross section through the middle of a second embodiment of a crank assembly 25, as seen in an isometric view, and FIG. 19 illustrates a dust cover 6 for the second embodiment of a crank assembly 25, as seen in an isometric view.

In this embodiment the rotating bicycle joint assembly 22 is designed similarly to the design disclosed in FIGS. 14 and 15 but in this embodiment the stationary intermediate part 32 is provided with an axial groove 14 so that the "free" end of the dust cover 6 is tucked away inside this axial groove 14. As best seen in FIG. 19 the impeller 9 is in this embodiment arranged on an outermost axially extending surface of the dust cover 6 and in this embodiment the impeller 9 is provided with impeller surfaces 15 facing in both directions to reduce the risk of dirt, mud and other finding its way to the bearing 4 no matter which way the user of the bicycle is rotating the crank shaft 30.

Illustrations: A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure is not limited to these example illustrations but rather encompasses all possible modifications and variations within the scope of the issued claims and their equivalents.

Illustration 1. A rotating bicycle joint assembly 22 comprising, a rotating joint part 23, a fixed joint part 24, a bearing 4 located between the rotating joint part 23 and the fixed joint part 24 with an outer part 5 of said bearing 4 fixed in relation to one of said rotating joint part 23 and said fixed joint part 24, and wherein an inner part 7 of said bearing 4 is fixed in relation to the other of said rotating joint part 23 and said fixed joint part 24, a dust cover 6 having an outer cover diameter OCD of said dust cover 6 being bigger than an outer bearing diameter OBD of said bearing 4, so that an outer periphery 8 of said dust cover 6 is extending radially past said outer part 5, and an impeller 9 arranged at said outer periphery 8 of said dust cover 6, wherein said impeller 9 is fixed in relation to said rotating joint part 23, and wherein said dust cover 6 is fixed in relation to said inner part 7 of said bearing 4.

Illustration 2. A rotating bicycle joint assembly 22 according to Illustration 1, wherein said bearing 4 is a rolling bearing 4, wherein said outer part 5 is an outer ring 10 of said rolling bearing 4 and said inner part 7 is an inner ring 11 of said rolling bearing 4, and wherein rolling elements 12 are located between said inner ring 11 and said outer ring 10.

Illustration 3. A rotating bicycle joint assembly 22 according to Illustration 2, wherein said rolling bearing 4 comprises a non-contact seal 13 between said inner ring 11 and said outer ring 10.

Illustration 4. A rotating bicycle joint assembly 22 according to any of the preceding Illustrations, wherein said outer periphery 8 of said dust cover 6 is extending radially past said outer part 5 and further axially into an axial groove 14 in said rotating joint part 23 or said fixed joint part 24, and wherein said impeller 9 is arranged in said axial groove 14.

Illustration 5. A rotating bicycle joint assembly 22 according to any of the preceding Illustrations, wherein said impeller 9 comprises a number of impeller surfaces 15 being inclined in relation to a joint assembly plane 16 being perpendicular in relation to a rotational axis 17 of said rotating joint part 23.

Illustration 6. A rotating bicycle joint assembly 22 according to Illustration 5, wherein said impeller surfaces 15 are inclined in a surface angle SA between 2 and 80 degrees, preferably between 5 and 60 degrees and most preferred between 8 and 45 degrees in relation to said joint assembly plane 16.

Illustration 7. A rotating bicycle joint assembly 22 according to Illustration 5 or 6, wherein said impeller surfaces 15 are also inclined in a radial direction of said rotating joint part 23 so that a radial extent of said impeller surfaces 15 increase outwards.

Illustration 8. A rotating bicycle joint assembly 22 according to any of the preceding Illustrations, wherein a maximum radial extent of said impeller 9 is between 0.5 and 20%, preferably between 1% and 15% and most preferred between 1.5% and 10% of an outer impeller diameter of said impeller 9.

Illustration 9. A rotating bicycle joint assembly 22 according to any of the preceding Illustrations, wherein said impeller 9 is arranged outside said outer periphery 8 of said dust cover 6 as seen in an axial direction of said rotating joint part 23.

Illustration 10. A rotating bicycle joint assembly 22 according to any of the preceding Illustrations, wherein said impeller 9 is formed integrally with said rotating joint part 23 or integrally with said dust cover 6.

Illustration 11. A rotating bicycle joint assembly 22 according to any of Illustrations 1-9, wherein said impeller 9 is formed as an independent part connected to said rotating joint part 23 or to said dust cover 6.

Illustration 12. A method for preventing ingress of dirt in a bearing 4 of a rotating bicycle joint assembly 22, said method comprises the steps of:
  placing said bearing 4 between a rotating joint part 23 and a fixed joint part 24 of said rotating bicycle joint assembly 22,
  fixating an outer part 5 of said bearing 4 in relation to one of said rotating joint part 23 and said fixed joint part 24, and fixating an inner part 7 of said bearing 4 in relation to the other of said rotating joint part 23 and said fixed joint part 24, fixating a dust cover 6 of said rotating bicycle joint assembly 22 in relation to said inner part 7 of said bearing 4, wherein an outer cover diameter OCD of said dust cover 6 is bigger than an outer bearing diameter OBD of said bearing 4, so that said dust cover 6 is extending radially past said outer part 5, fixating an impeller 9 of said rotating bicycle joint assembly 22 in relation to said rotating joint part 23 at said outer cover diameter OCD of said dust cover 6, and rotating said rotating joint part 23 and said impeller 9 so that said impeller 9 deflects dirt away from said rotating joint part 23.

Illustration 13. A method according to Illustration 12, wherein said method comprises the step of fixating said impeller 9 in relation to said rotating joint part 23 by forming said impeller 9 integrally with said rotating joint part 23 or integrally with said dust cover 6.

Illustration 14. A method according to Illustration 12 or 13, wherein said method is performed by means of a rotating bicycle joint assembly 22 according to any of illustrations 1-11.

Illustration 15. Use of a rotating bicycle joint assembly 22 according to any of Illustrations 1-11 in a pulley wheel system 18, a crank assembly 25 or a wheel hub assembly 26 of a derailleur system for a bicycle.

The invention has been exemplified above with reference to specific examples of rotating joint parts 23, fixed joint parts 24, bearings 4, impellers 9 and other. However, it should be understood that the invention is not limited to the particular examples described above but may be designed and altered in a multitude of varieties within the scope of the invention as specified in the claims.

LIST

1. Sprocket assembly
2. Sprocket
3. Centre orifice of sprocket
4. Bearing
5. Outer part of bearing
6. Dust cover
7. Inner part of bearing
8. Outer periphery of dust cover
9. Impeller
10. Outer ring of rolling bearing
11. Inner ring of rolling bearing
12. Rolling element
13. Non-contact seal
14. Axial groove
15. Impeller surface
16. Joint assembly plane
17. Rotational axis of rotating joint part
18. Pulley wheel system
19. Cage
20. Side arm
21. Sprocket shaft
22. Rotating bicycle joint assembly
23. Rotating joint part
24. Fixed joint part
25. Crank assembly
26. Wheel hub assembly
27. Hub housing
28. Spoke
29. Pedal arm
30. Crank shaft
31. Crank housing
32. Intermediate part
33. Pressing mechanism
OCD. Outer cover diameter
OBD. Outer bearing diameter
SA. Surface angle

The invention claimed is:

1. A rotating bicycle joint assembly comprising:
    a rotating joint part,
    a fixed joint part,
    a bearing located between said rotating joint part and said fixed joint part, an outer part of said bearing fixed in relation to one of said rotating joint part or said fixed joint part, and an inner part of said bearing being fixed in relation to the other of said rotating joint part or said fixed joint part,
    a dust cover having an outer cover diameter of said dust cover being bigger than an outer bearing diameter of said bearing, so that an outer periphery of said dust cover extends radially past said outer part, and
    an impeller arranged at said outer periphery of said dust cover and fixed in relation to said rotating joint part, said impeller including a plurality of flat impeller surfaces protruding outward and inclined in relation to a joint assembly plane, which extends perpendicularly in relation to a rotational axis of said rotating joint part, said plurality of flat impeller surfaces being inclined at a surface angle between 5 and 60 degrees in relation to said joint assembly plane, and a maximum radial extent of said impeller ranging from 1% to 15% of an outer impeller diameter of said impeller,
    wherein said dust cover is fixed in relation to said inner part of said bearing.

2. The rotating bicycle joint assembly according to claim 1, wherein said bearing is a rolling bearing,
    wherein said outer part is an outer ring of said rolling bearing and said inner part is an inner ring of said rolling bearing, and
    wherein rolling elements are located between said inner ring and said outer ring.

3. The rotating bicycle joint assembly according to claim 2, wherein said rolling bearing comprises a non-contact seal between said inner ring and said outer ring.

4. The rotating bicycle joint assembly according to claim 1, wherein said outer periphery of said dust cover is extending radially past said outer part and further axially into an axial groove in said rotating joint part or said fixed joint part, and
    wherein said impeller is arranged in said axial groove.

5. The rotating bicycle joint assembly according to claim 1, wherein said impeller surfaces are inclined in a surface angle between 10 and 50 degrees in relation to said joint assembly plane.

6. The rotating bicycle joint assembly according to claim 1, wherein said impeller surfaces are also inclined in a radial direction of said rotating joint part so that a radial extent of said impeller surfaces increase outwards.

7. The rotating bicycle joint assembly according to claim 1, wherein a maximum radial extent of said impeller is between 1.5% and 10% of an outer impeller diameter of said impeller.

8. The rotating bicycle joint assembly according to claim 1, wherein said impeller is arranged outside said outer periphery of said dust cover as seen in an axial direction of said rotating joint part.

9. The rotating bicycle joint assembly according to claim 1, wherein said impeller is formed integrally with said rotating joint part or integrally with said dust cover.

10. The rotating bicycle joint assembly according to claim 1, wherein said impeller is formed as an independent part connected to said rotating joint part or to said dust cover.

11. A method for preventing ingress of dirt in a bearing of a rotating bicycle joint assembly, said method comprises steps of:
    placing said bearing between a rotating joint part and a fixed joint part of said rotating bicycle joint assembly,
    fixating an outer part of said bearing in relation to one of said rotating joint part or said fixed joint part, and fixating an inner part of said bearing in relation to the other of said rotating joint part or said fixed joint part,
    fixating a dust cover of said rotating bicycle joint assembly in relation to said inner part of said bearing, wherein an outer cover diameter of said dust cover is bigger than an outer bearing diameter of said bearing, so that said dust cover extends radially past said outer part,
    fixating an impeller of said rotating bicycle joint assembly in relation to said rotating joint part at said outer cover diameter of said dust cover, said impeller including a plurality of flat impeller surfaces protruding outward and inclined in relation to a joint assembly plane, which extends perpendicularly in relation to a rotational axis of said rotating joint part, said plurality of flat impeller surfaces being inclined at a surface angle between 5 and 60 degrees in relation to said joint assembly plane, and a maximum radial extent of said impeller ranging from 1% to 15% of an outer impeller diameter of said impeller, and
    rotating said rotating joint part and said impeller, so that said impeller deflects dirt away from said rotating joint part.

12. The method according to claim 11, wherein the step of fixating said impeller in relation to said rotating joint part includes forming said impeller integrally with said rotating joint part or integrally with said dust cover.

13. The method according to claim 11, further comprising providing the rotating bicycle joint assembly.

14. A pulley wheel system, a crank assembly, or a wheel hub assembly of a bicycle, comprising:
    a rotating bicycle joint assembly including:
        a rotating joint part,
        a fixed joint part,
        a bearing located between said rotating joint part and said fixed joint part, an outer part of said bearing fixed in relation to one of said rotating joint part or said fixed joint part, and an inner part of said bearing being fixed in relation to the other of said rotating joint part or said fixed joint part,
        a dust cover having an outer cover diameter of said dust cover being bigger than an outer bearing diameter of said bearing, so that an outer periphery of said dust cover extends radially past said outer part, and
        an impeller arranged at said outer periphery of said dust cover and fixed in relation to said rotating joint part, said impeller including a plurality of flat impeller surfaces protruding outward and inclined in relation to a joint assembly plane, which extends perpendicularly in relation to a rotational axis of said rotating joint part, said plurality of flat impeller surfaces being inclined at a surface angle between 5 and 60 degrees in relation to said joint assembly plane, and a maximum radial extent of said impeller ranging from 1% to 15% of an outer impeller diameter of said impeller,
    wherein said dust cover is fixed in relation to said inner part of said bearing.

* * * * *